United States Patent [19]
Iwata et al.

[11] Patent Number: 6,033,522
[45] Date of Patent: Mar. 7, 2000

[54] SURFACE TREATMENT METHOD AND APPARATUS FOR ROTATABLE DISC

[75] Inventors: Tetsuya Iwata; Nobuo Nakazawa, both of Nagaoka, Japan

[73] Assignee: System Seiko Co., Ltd., Niigata, Japan

[21] Appl. No.: 09/105,624

[22] Filed: Jun. 26, 1998

[30] Foreign Application Priority Data

Jul. 8, 1997 [JP] Japan .................................. 9-181966

[51] Int. Cl.$^7$ .................................................. C23F 1/02
[52] U.S. Cl. ........................................... 156/345; 451/302
[58] Field of Search ........................... 29/603.16–603.18; 118/503; 156/345; 204/298; 427/127, 128; 428/64; 451/37, 59, 168, 302, 303, 306, 307

[56] References Cited

U.S. PATENT DOCUMENTS

| | | | |
|---|---|---|---|
| 4,973,496 | 11/1990 | Kruger et al. | 427/129 |
| 5,486,134 | 1/1996 | Jones et al. | 24/29 |
| 5,490,809 | 2/1996 | Jones et al. | 24/57 |
| 5,785,585 | 7/1998 | Manfredi et al. | 451/288 |
| 5,798,164 | 8/1998 | Weiss et al. | 428/141 |
| 5,820,446 | 10/1998 | Lu | 451/37 |

FOREIGN PATENT DOCUMENTS

| | | | |
|---|---|---|---|
| 3-3765 | 1/1991 | Japan | B24B 7/04 |
| 7-14509 | 2/1995 | Japan | B08B 7/04 |

*Primary Examiner*—Bruce Breneman
*Assistant Examiner*—Alva C Powell
*Attorney, Agent, or Firm*—McCormick, Paulding & Huber LLP

[57] ABSTRACT

In a surface treatment apparatus for a rotating disc 10, the outer peripheries of the disc 10 are brought into contact with a pair of positioning rollers 13, 14 to position the disk 10 at the predetermined position. A first treatment roller 17 brought into contact with one of the surfaces of the disc 10 and a second treatment roller 18 brought into contact with the other surface of the disc 10 are arranged at both side of the disk 10, and the rollers 17, 18 are drive to move to come close to and away from each other. When the disk 10 is held between the rollers 17, 18, the frictional force of the rollers relative to the disc 10 is differentiated between an end and the opposite end of each of the rollers, thereby, the rotary motions of the rollers 17, 18 are transformed into a rotary motion of the disc 10 to treat the surfaces of the rotating disc.

10 Claims, 11 Drawing Sheets

SURFACE TREATMENT METHOD AND APPARATUS FOR ROTATABLE DISC

BACKGROUND OF THE INVENTION

1. Field of the Invention

This invention relates to a technology of treating the surface of a rotatable disc such as a magnetic disc to be used as a storage medium of a computer.

2. Related Art Statement

A magnetic disc to be used as a storage medium of a computer is typically produced by boring a through hole at the center of a disc made of an aluminum alloy or the like to make it show predetermined inner and outer diameters and then subjecting it to a sequence of surface treatment steps. The surface treatment steps include a grinding step for grinding the surface by means of a grinding wheel, a lapping step using a lapping agent containing abrasive grains of alumina, silicon carbide, diamond or the like, a polishing step using a polishing agent containing grains finer than those of the lapping agent, a sputtering step for forming a magnetic film on the surface, a plating step, a cleaning step and a visual inspection step.

In the course of forming a magnetic film, the magnetic disc is subjected to a texturing operation for improving the orientation of the magnetic film, where fine streaks are produced on the mirror polished surface of the disc to make it slightly coarse.

Various surface treatment apparatus have been proposed to treat the surface of a disc in various different ways such as cleaning the surface. Many of them comprise a treatment roller, the outer peripheral surface of which is pressed against the surface of the disc to be treated and slidingly moved relative to the disc. Japanese Patent Publication No. 7-14509 discloses an apparatus for cleaning a disc.

With any known surface treatment apparatus of the above described type, a support roller for supporting the disc is driven to rotate by means of a drive source, thereby driving the disc to rotate. On the other hand, a brush-like member for cleaning the surface of the disc is driven by means of another drive source to slidingly move on the surface of the disc. Thus, known surface treatment apparatus comprise two drive sources, one for driving the disc and the other for driving the brush to inevitably make the apparatus rather complex.

SUMMARY OF THE INVENTION

In view of the above pointed out problem, it is therefore the object of the present invention to provide a technology for treating the two sides of a rotatable disc with each for various operations including cleaning and polishing.

According to an aspect of the present invention, the above object is achieved by providing a surface treatment method for a rotatable disc, characterized by comprising steps of:

bringing a pair of positioning rollers into contact with the outer periphery of said rotatable disc;

holding said rotatable disc between a first treatment roller brought in contact with one of the surfaces of said rotatable disc and a second treatment roller arranged along said first treatment roller and brought in contact with the other surface of said rotatable disc;

differentiating the frictional force of said two treatment rollers relative to said rotatable disc between an end and the opposite end of each of said two treatment rollers;

feeding said two treatment rollers with a treatment solution;

transforming the oppositely directed rotary motions of said two treatment rollers into a rotary motion of said rotatable disc by means of differentiated frictional force; and causing the outer peripheral surfaces of said treatment rollers to slide on the corresponding surfaces of said rotatable disc to treat the surfaces of the rotatable disc by means of said two treatment rollers.

For the purpose of the invention, said two treatment rollers may be made to axially oscillate along the respective surfaces of said rotatable disc.

The foreign objects, if any, adhering to the outer peripheral surfaces of said two treatment rollers may be removed by means of foreign object removing members brought in contact with the outer peripheral surfaces of the respective treatment rollers.

According to another aspect of the present invention, there is provided a surface treatment apparatus for a rotatable disc, characterized by comprising:

a pair of positioning rollers brought in contact with the outer periphery of the rotatable disc to positionally set the center of said rotatable disc;

a first treatment roller adapted to contact one of the surfaces of said rotatable disc;

a second treatment roller arranged along said first treatment roller and adapted to move close to and away from said first treatment roller and contact the other surface of said rotatable disc in order to hold said rotatable disc with said first treatment roller and apply frictional force along with said first treatment roller, said frictional force being differentiated between the opposite ends of the treatment rollers;

a treatment solution feeding means for feeding each of the treatment rollers with a treatment solution; and drive means for driving said first and second treatment rollers in respective directions opposite to each other;

said apparatus being adapted to transform the oppositely directed rotary motions of said two treatment rollers into a rotary motion of said rotatable disc by means of differentiated frictional force and cause the outer peripheral surfaces of said treatment rollers to slide on the corresponding surfaces of said rotatable disc to treat the surfaces of the rotatable disc by means of said two treatment rollers.

For the purpose of the invention, the distance between the axes of rotation said treatment rollers may be differentiated between the opposite ends of the treatment rollers or, alternatively, the outer diameter of at least one of the treatment rollers may be differentiated between the opposite ends thereof.

Further, it may be so arranged that said first treatment roller is fitted to a first movable table adapted to reciprocatingly move along the radial direction of the roller and said second treatment roller is fitted to a second movable table adapted to move in the direction same as that of said first movable table so that said first and second treatment rollers may come close to and away from each other by moving at least one of said first and second movable table.

Alternatively, it may be so arranged that said first treatment roller is fitted to a first movable table adapted to reciprocatingly move along the radial direction of the roller and said second treatment roller is fitted to a second movable table adapted to move in the direction same as that of said first movable table, a cam member being provided between said first and second moving tables so as to be movable back and forth in a direction perpendicular relative to the moving direction of said first and second moving tables and engaged with cam followers arranged respectively on said first and second movable tables, the distance between said first moving table and said second moving table is adapted to be adjustable by means of moving of said cam member.

Still alternatively, it may be so arranged that said first treatment roller is fitted to a third movable table adapted to reciprocatingly move along the axial direction of the roller and said second treatment roller is fitted to a fourth movable table adapted to move in the direction same as that of said third movable table, said third and fourth movable tables being provided with respective cam following members, an eccentric cam being arranged in engagement with said cam following members and rotated to reciprocatingly drive said third and fourth movable tables in the axial direction of said first and second treatment rollers.

In a preferable arrangement, said first treatment roller is fitted to the front end of a first oscillation arm having its axis of oscillation disposed in parallel with the axis of rotation of said first treatment roller and said second treatment roller is fitted to the front end of a second oscillation arm having its axis of oscillation disposed in parallel with the axis of rotation said second treatment roller so that said first and second treatment rollers are moved close to and away from each other by oscillating at least either of said first and second oscillation arms around its axis of oscillation.

Thus, according to the invention, the rotary motion of the first and second treatment rollers arranged at the opposite sides of the rotatable disc and holding the disk therebetween is transformed into a rotary motion of the disc to eliminate the need of arranging a drive source for the rotatable disc and simplify the overall configuration of the apparatus for treating the rotatable disc.

Additionally, when the treatment rollers are adapted to reciprocatingly move on the respective surfaces of the rotatable disc along the axial direction, the outer peripheral surfaces of the treatment rollers would not lopsidedly contact the respective surfaces of the rotatable disc and hence the rotating disc can be treated reliably and accurately.

Still additionally, when scrapers are provided to remove the foreign objects adhering to the outer peripheral surfaces of the treatment rollers, the rotatable disc can be treated further reliably and accurately.

Finally, when it is so arranged that the two treatment rollers are brought into contact with the rotatable disc slowly and gradually, the rotatable disc is made free from colliding impact when the treatment rollers contact the rotatable disc and hence free from damages that can take place due to such impact.

The above described and other objects and novel features of the present invention will become apparent more fully from the description that follows in this specification when read in conjunction with the accompanying drawings.

DESCRIPTION OF THE PREFERRED EMBODIMENTS

Now, the present invention will be described by referring to the accompanying drawings that illustrate preferred embodiments of the invention.

Figure 1:
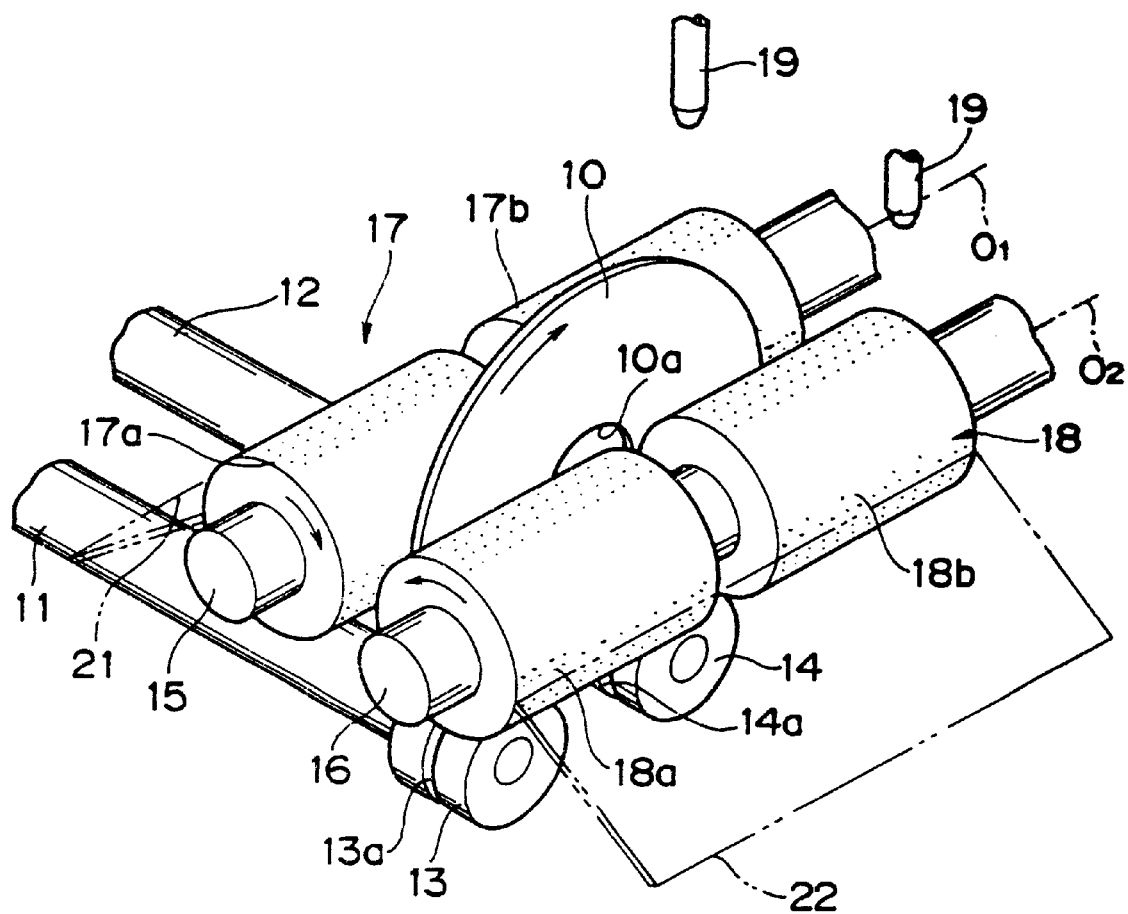
FIG. 1 is a schematic perspective view of a first embodiment of surface treatment apparatus for treating the surface of a rotatable disc according to the invention, showing its basic configuration.
Figure 2:
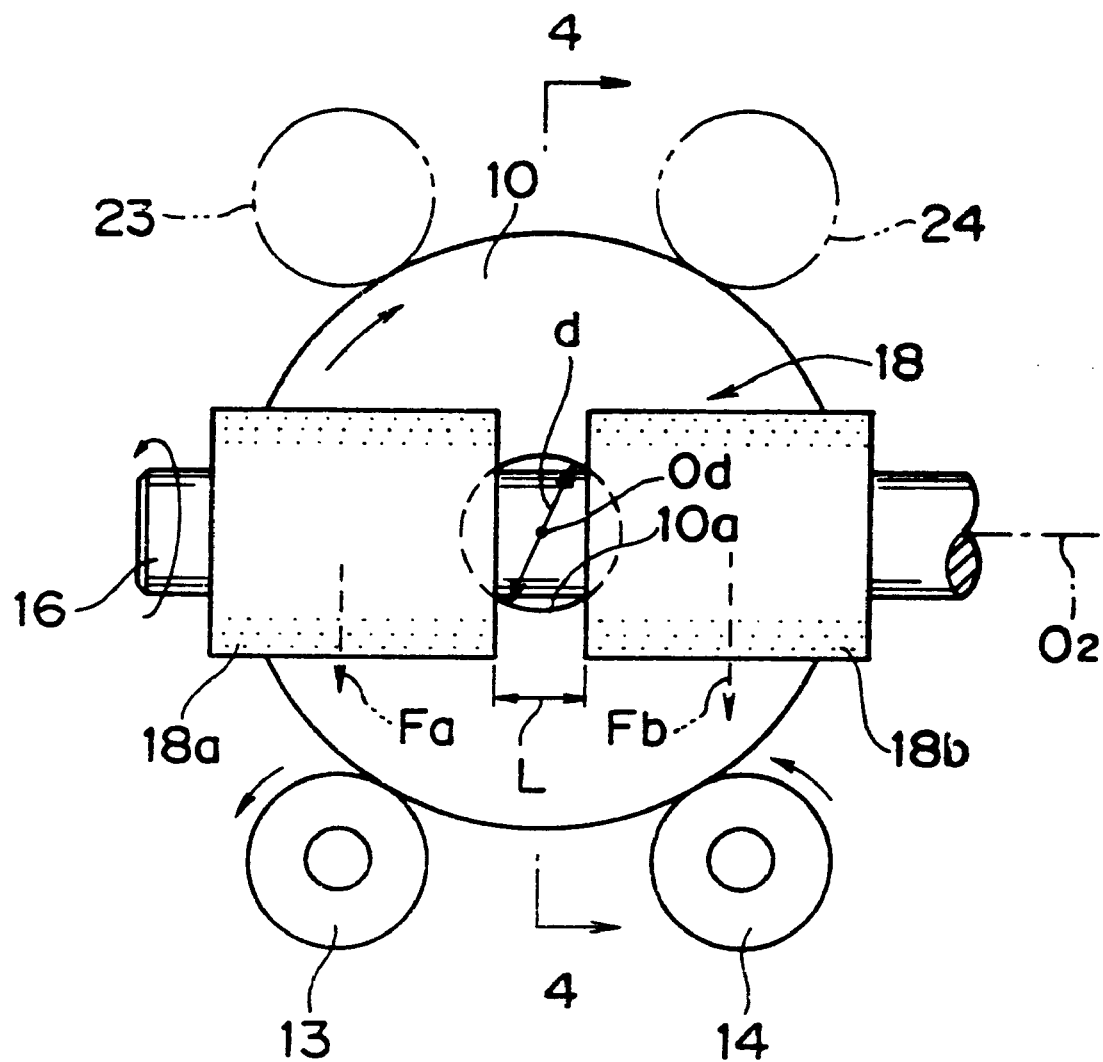
FIG. 2 is a schematic front view of the embodiment of FIG. 1.
Figure 3:
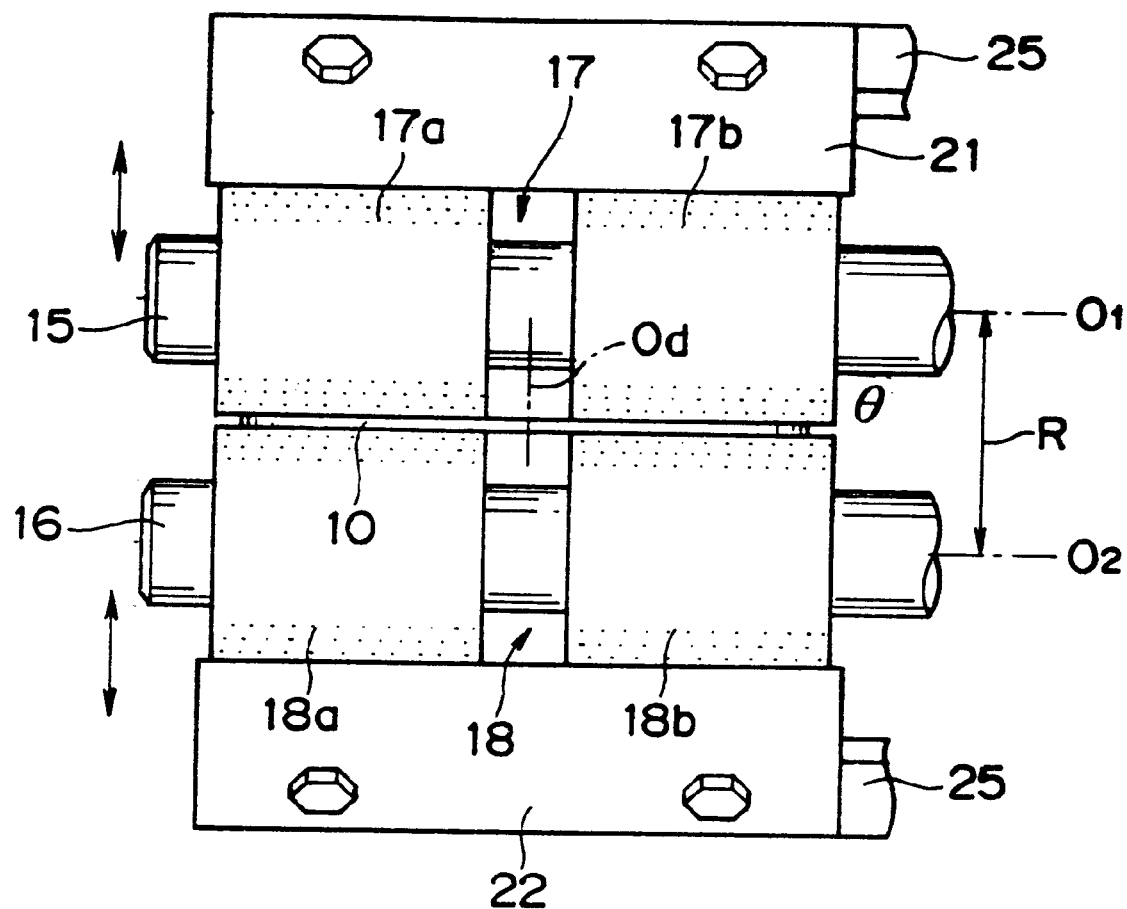
FIG. 3 is a schematic plan view of the embodiment of FIG. 2.
Figure 4:
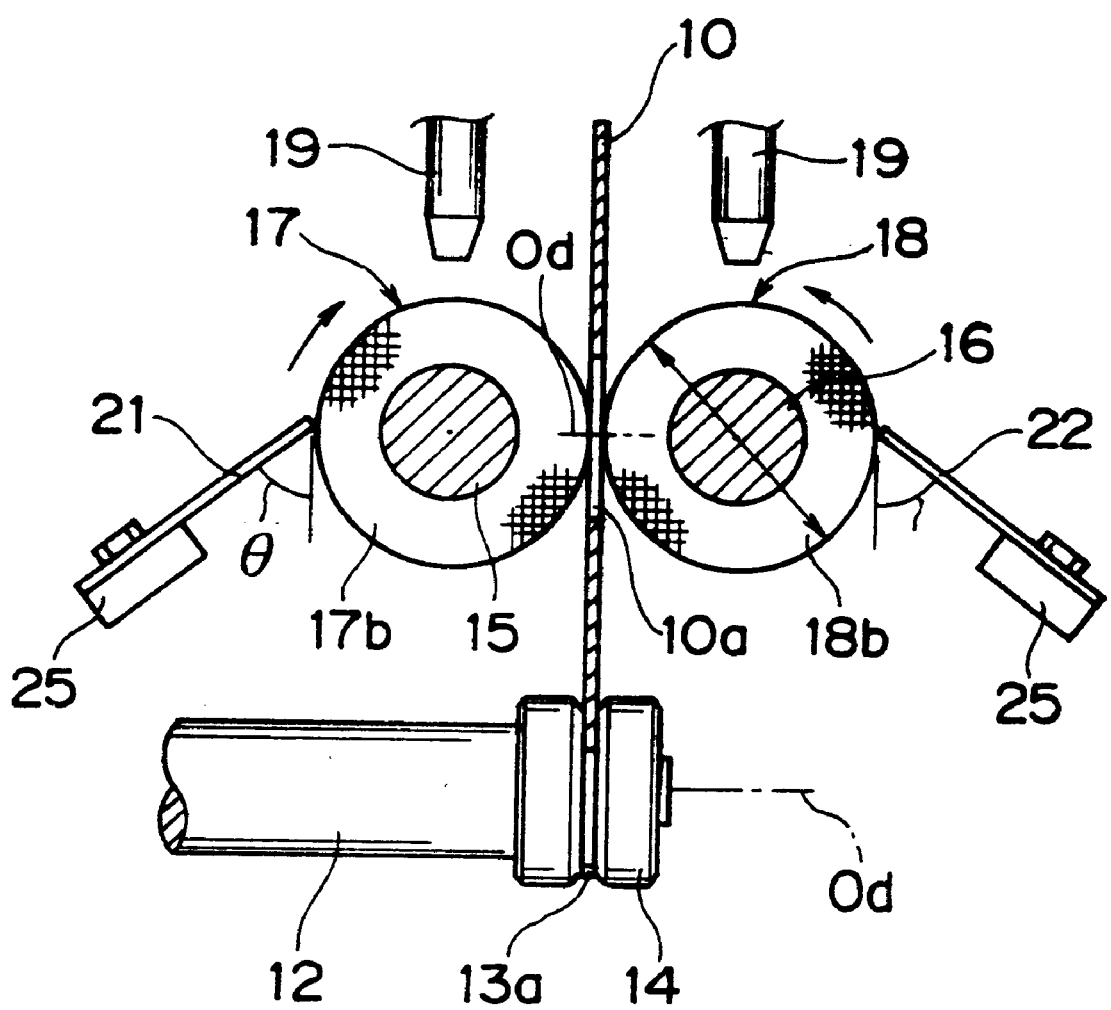
FIG. 4 is a schematic cross sectional view of the embodiment of FIG. 2 taken along line 4—4.

FIG. 1 is a schematic perspective view of a first embodiment of surface treatment apparatus for treating the flat surfaces of a rotatable disc according to the invention, showing its basic structure and FIG. 2 is a schematic front view of the embodiment whereas FIG. 3 is a schematic plan view of the embodiment and FIG. 4 is a schematic cross sectional view of the embodiment taken along line 4—4 in FIG. 2.

The illustrated embodiment of surface treatment apparatus is adapted to perform operations of polishing and/or texturing the flat surfaces of a rotatable disc 10. The apparatus comprises a pair of positioning rods 11, 12 arranged in parallel with each other and extending substantially horizontally. The paired positioning rods 11, 12 are provided at the front ends thereof with respective positioning rollers 13, 14 for holding the disc 10, said rollers 13, 14 being rotatable relative to the respective rods 11, 12. The disc 10 is brought in contact with the rollers 13, 14 at the outer periphery thereof so that its axis of rotation $O_d$ may not be displaced.

The rollers 13, 14 are provided on the outer peripheral surfaces thereof with respective annular grooves 13a, 14a for receiving the outer periphery of the disc 10. Note, however, that the annular grooves 13a, 14a are not indispensable and the rollers may alternatively have a flat outer peripheral surface.

A first drive shaft 15 is arranged above the rods 11, 12 and extends horizontally and substantially rectangularly relative to the rods 11, 12. A second drive shaft 16 is arranged along the drive shaft 15. A first treatment roller 17 is secured to the drive shaft 15 and brought in contact with a first one of the two flat surfaces of the disc 10 that is held in position by the rollers 13, 14. A second treatment roller 18 is secured to the drive shaft 16 and brought in contact with the other or second flat surface of the disc 10.

The drive shafts 15, 16 are adapted to be moved toward and away from each other in the directions as indicated by arrows in FIG. 3. The disc 10 is pinched and securely held by the rollers 17, 18 as the drive shafts 15, 16 are moved closer to each other, whereas the disc 10 can be placed in position and taken out when the drive shafts 15, 16 are moved away from each other. Note, however, that the point here is that the rollers 17, 18 can be moved toward and away from each other. Thus, it may be so arranged that only one of the treatment rollers is adapted to horizontal translation and can be moved toward and away from the other treatment roller.

Each of the rollers 17, 18 is provided with a grinding pad that is made of woven or non-woven fabric and wound around the roller. As shown in FIG. 1, the rollers 17, 18 are respectively divided into front rollers 17a, 18a located at one end section of the rollers 17, 18 (located toward the left end in FIG. 1) and rear rollers 17b, 18b located at the opposite end section (located toward the right end in FIG. 1), all of which are equally secured to the respective drive shafts 15, 16. The front rollers and the corresponding rear rollers are separated by a distance smaller than the diameter of the through bore 10a of the disc 10.

When the disc 10 is held between the two rollers 17, 18, the axes of rotation $O_1$, $O_2$ of the drive shafts 15, 16 intersect the line extending from the axis of rotation $O_d$ of the disc 10. Under this condition, the outer peripheral surfaces of the front rollers 17a, 18a contact the respective opposite surfaces of the disc 10 at positions located between the through bore 10a and the outer periphery of the disc 10. On the other hand, the outer peripheral surfaces of the rear rollers 17b, 18b contact the respective opposite surfaces of the disc 10 at positions angularly displaced by 180° that get to the front rollers 17a, 18a when the disc 10 is rotated by 180°.

The drive shafts 15, 16 are driven to rotate in the opposite directions relative to each other. Thus, as shown in FIG. 4, the disc 10 held by the two rollers 17, 18 is subjected to frictional force directed to the rollers 13, 14 by the rollers 17, 18. If the frictional force Fb generated by the rear rollers 17b, 18b of the rollers 17, 18 is made greater than the frictional force Fa generated by the front rollers 17a, 17a, the disc 10 is driven to rotate in the sense as indicated by the arrow on the disc 10 in FIG. 2.

Then, the outer peripheral surfaces of the rollers 17, 18 slide relative to the corresponding surfaces of the disc 10. The sliding speed of the outer peripheral surface of each of the rollers 17, 18 varies as a function of the radial position on the corresponding surface of the disc 10 because the rotary speed of a given point on the disc 10 is expressed as a function of the radial distance of that point from the center of the disc 10.

Thus, with this embodiment of surface treatment apparatus, the frictional force generated between the rollers 17, 18 and the disc 10 held between them is differentiated between one ends and the other ends of the rollers 17, 18. As a result, by rotating the rollers 17, 18 in the opposite directions, the rotary motion of the rollers 17, 18 is transformed into the rotary motion of the disc 10 and the disc 10 is made to slide relative to the outer peripheral surfaces of the rollers 17, 18. Then, this sliding motion is utilized to perform various processing operations including those of removing the foreign objects adhering to the surface of the disc 10 and cleaning, polishing and texturing the surface of the disc 10. Fluid treatment agents such as slurried fluid polishing agent containing abrasive grains may be fed to the rollers 17, 18 through the nozzle 19 for these processing operations.

The inter-axial distance R (see FIG. 3) between the axis of rotation $O_1$ of the roller 17 and the axis of rotation $O_2$ of the roller 18 may be differentiated in such a way that it is greater between the front rollers 17a, 18a than between the rear rollers 17b, 18b in order to differentiate the frictional force of the rollers 17, 18 and the disc 10 between one ends and the other ends of the rollers 17, 18, or between the front rollers 17a, 18a and the rear rollers 17b, 18b more specifically. Alternatively, the rear rollers 17b, 18b may be made to have an outer diameter greater than the front rollers 17a, 18a. Still alternatively, the rollers 17, 18 may be tapered from one ends toward the other ends thereof without dividing them into front and rear rollers. The front rollers 17a, 18a and the rear rollers 17b, 18b may be made of different materials, which are selected such that the material of the rear rollers 17b, 18b shows a coefficient of friction greater than that of the material of the front rollers 17a, 18a.

Thus, while the illustrated rollers 17, 18 are divided into front and rear rollers, they may alternatively be realized as unitary rollers. The frictional force may be differentiated in such a way that it is greater at the side of the front rollers than at the rear rollers. If such is the case, the disc 10 will be driven to rotate in the opposite direction to that as shown in FIG. 2.

Referring to FIGS. 3 and 4, scrapers 21, 22 that are made of an elastically deformable plate such as metal plate are arranged respectively at the outer lateral sides of the rollers 17, 18 to remove foreign objects from the latter. The oppositely disposed lateral edges of the scrapers 21, 22 are brought in contact with the respective outer peripheral surfaces of the rollers 17, 18 at positions diametrical relative to the positions of the disc 10 where the disc contacts the outer peripheral surfaces of the rollers 17, 18. The scrapers 21, 22 operate to remove the foreign objects adhering to the outer peripheral surfaces of the rollers 17, 18. Note that the scrapers 21, 22 shows an acute angle θ relative to the respective outer peripheral surfaces of the rollers 17, 18 as viewed from the upstream of the rotating rollers. Also note that the scrapers 21, 22 are only indicated by dotted broken lines in FIG. 1 and totally omitted in FIG. 2.

While the disc 10 is supported and held in position by a pair of rollers 13, 14 arranged under the disc 10 in the illustrated embodiment, it may alternatively be held in position by means of a total of four rollers, two of which, or upper positioning rollers 23, 24 are indicated by dotted broken lines in FIG. 2. If such is the case, the upper rollers 23, 24 may have to be moved away each time the disc 10 is set in position or taken out. When four positioning rollers are used, the disc 10 will be subjected to frictional force and pressed against the upper rollers 23, 24 for positioning by driving the drive shafts 15, 16 to rotate in the directions opposite to those indicated in FIG. 2.

Further, the disk 10 may be positioned by the upper rollers 23, 24 without providing the lower rollers 13, 14. If such is the case, the drive shafts 15, 16 respectively drive in the opposite directions to the illustrated ones.

Figure 5:
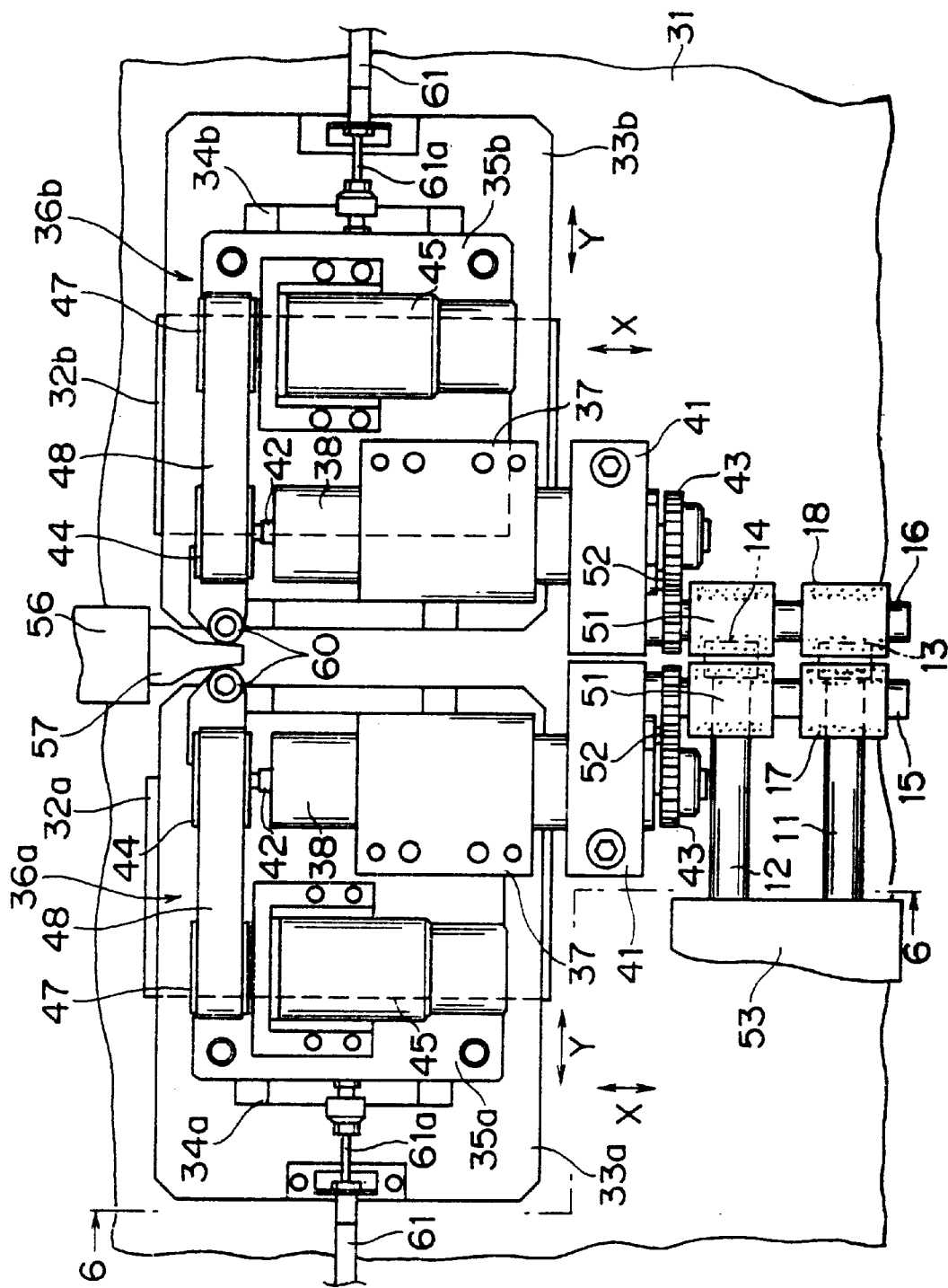
FIG. 5 is a schematic plan view of the drive mechanism of the embodiment of surface treatment apparatus of FIGS. 1 through 4.
Figure 6:
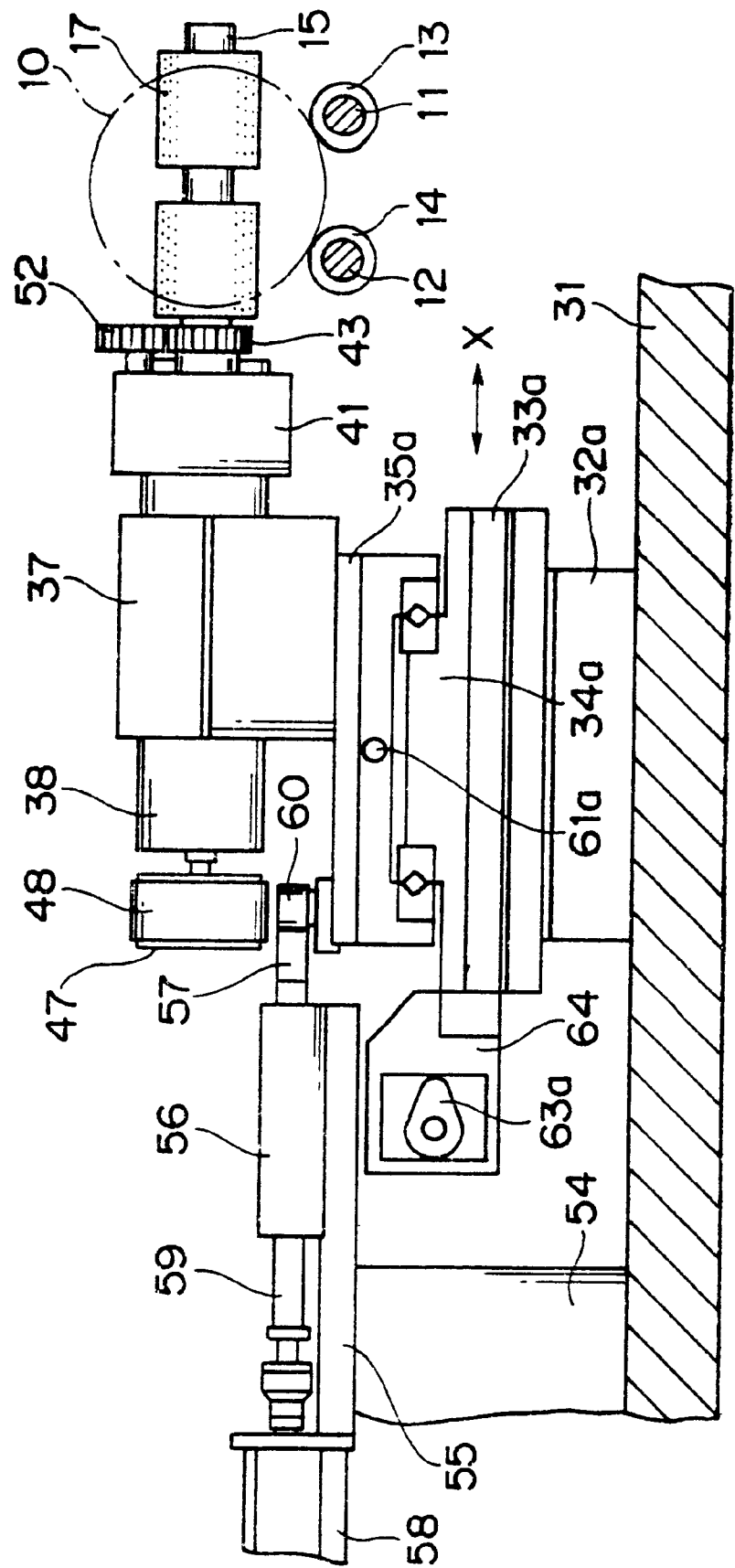
FIG. 6 is a schematic cross sectional view of the drive mechanism of FIG. 5 taken along line 6—6 in FIGS. 5 and 8.
Figure 7:
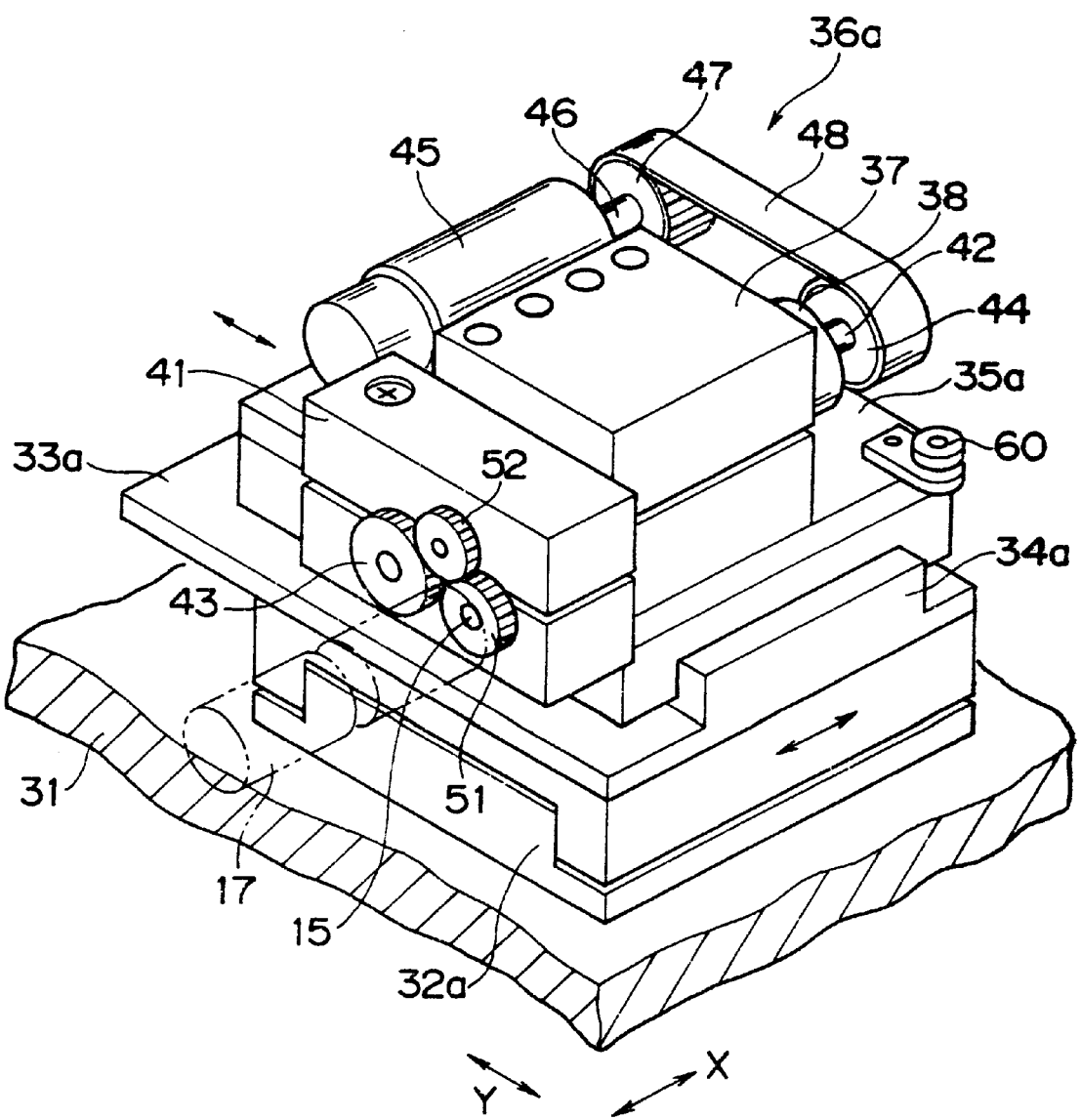
FIG. 7 is a schematic perspective view of a principal area of the drive mechanism of FIG. 5.

FIGS. 5 through 8 shows the drive mechanisms for driving the respective drive shafts 15, 16 of the above described embodiment of surface treatment apparatus. Referring to FIGS. 5 through 7, a pair of guides 32a, 32b are rigidly secured to a support table 31. The guides 32a, 32b are provided with respective oscillation tables 33a, 33b adapted to move back and forth along X-direction.

Another pair of guides 34a, 34b are arranged respectively on the tables 33a, 33b. The guides 34a, 34b are provided with respective sliding tables 35a, 35b, or first and second sliding tables, adapted to move reciprocatingly along Y-direction that is perpendicular relative to the X-direction.

The table 35a carries thereon a first drive mechanism 36a for driving the drive shaft 15. The table 35b carries thereon a second drive mechanism 36b for driving the drive shaft 16.

The drive mechanisms 36a, 36b are structurally identical and FIG. 7 shows only the first drive mechanism 36a.

Referring to FIG. 7, a support block 37 is rigidly secured to the table 35a and has a bearing sleeve 38 as a built-in component. A drive head 41 is rigidly fitted to the front end of the bearing sleeve 38. A spindle 42 is rotatably received in the bearing sleeve 38, running therethrough and a drive gear 43 is rigidly secured to the front end of the spindle 42. A pulley 44 is rigidly secured to the rear end of the spindle 42. An electric motor 45 for driving the spindle 42 is arranged on the table 35a and adjacent to the support block 37. A timing belt 48, which is an endless belt, is made to pass about the pulley 47 that is rigidly secured to the main shaft 46 of the motor 45 and the pulley 44.

The drive shaft 15 is rotatably received by the drive head 41. The drive shaft 15 carries a follower gear 51 rigidly secured thereto. The follower gear 51 is engaged with the drive gear 43 by way of an idle gear 52. Thus, as the motor 45 is driven, the roller 17 is driven to rotate in a predetermined direction by way of the drive shaft 15. The table 35b is structurally substantially identical with the table 35a except that its members are arranged symmetrically relative to their counterparts of the table 35a. Note, however, if one of the treatment rollers is made stationary and not moved in the Y-direction so that only the other treatment roller is driven to move, one of the sliding tables is held stationary relative to the oscillation table on which it is arranged.

The positioning rods 11, 12 are used to set the rotary position of the disc 10. As shown in FIG. 5, the rods 11, 12 fitted to a stationary table 53 rigidly secured to the support table 31. When a disc 10 is loaded on the rollers 13, 14, they have to be separated from each other by a predetermined distance. For treating the disc 10 by means of the rollers 17, 18, on the other hand, they have to be caused to approach each other. For this reason, a cam member, or a cam 57 is arranged and adapted to axially back and forth as seen from FIGS. 6 and 8. A support member 55 is rigidly secured to the support table 31 by way of a seat 54 and a guide 56 is fitted to the support member 55. The cam 57 is fitted to the guide 56.

Figure 8:
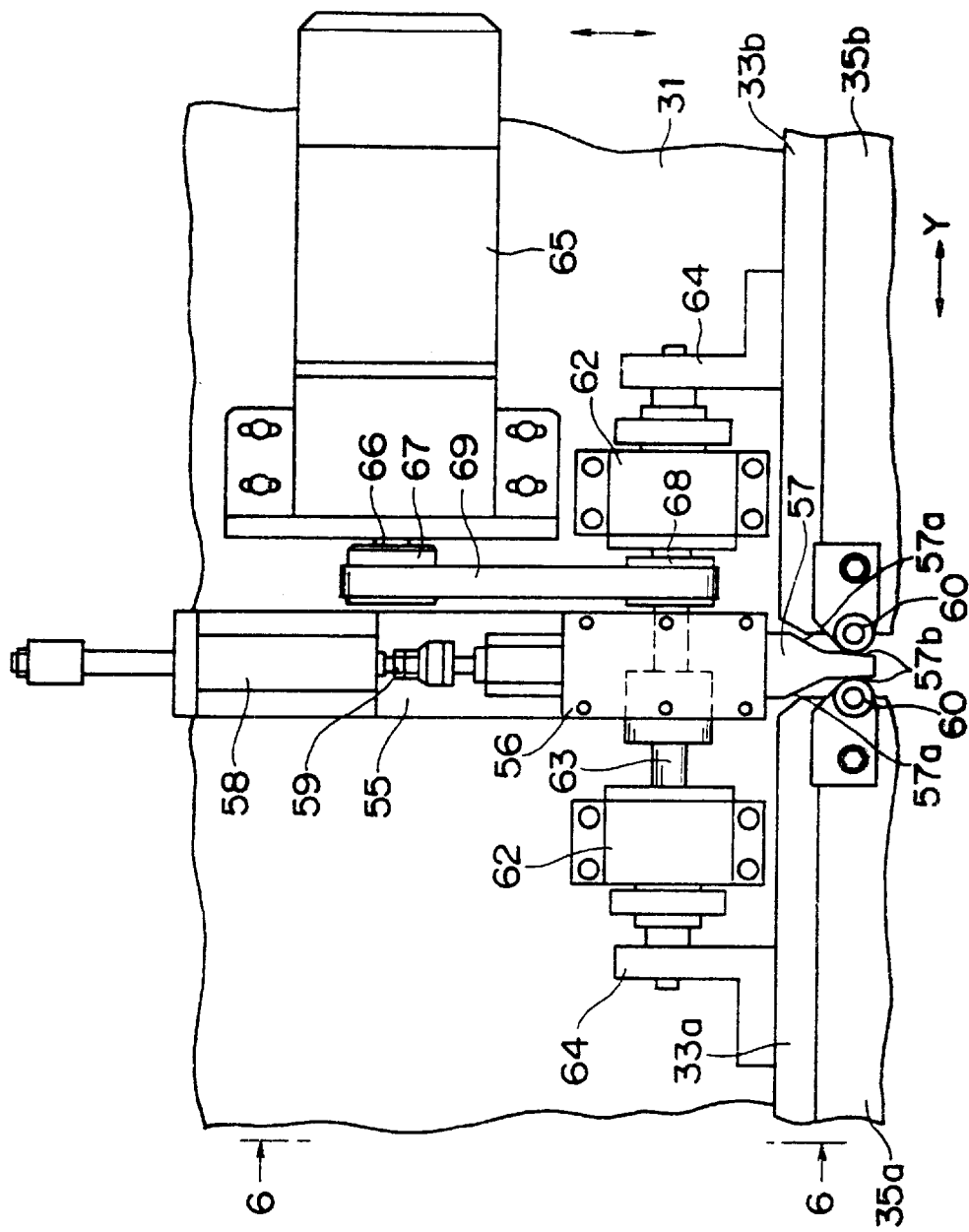
FIG. 8 is a schematic plan view of a part located adjacent to the drive mechanism of FIG. 5.

A pneumatic cylinder 58 is fitted to the support member 55 in order to axially move the cam 57 back and forth. The piston rod 59 that is driven by the pneumatic cylinder 58 is linked to the cam 57. As shown in FIG. 8, steep slopes 57a, 58a and relatively flat slopes 57b, 57b are formed at the front end of the cam 57. Thus, the cam 57 is generally tapered toward the front end. Cam followers, or cam rollers 60, 60 are fitted to the respective tables 35a, 35b and adapted to move rotationally on the respective slopes 57a, 57a and 57b, 57b.

Thus, as the cam 57 is driven to advance to the right in FIG. 8 by the pneumatic cylinder 58 and the cam rollers 60, 60 rotationally move on the respective slopes of the cam 57, the tables 35a, 35b are moved away from each other until they are separated by a predetermined distance. To the contrary, the tables 35a, 35b are moved closer to each other as the cam 57 is drive to retreat to the left in FIG. 8. More specifically, as the cam rollers 60, 60 rotationally move on the respective flat slopes 57b, 57b, the tables 35a, 35b approach each other slowly so that the two treatment rollers 17, 18 slowly and eventually come to contact the respective surfaces of the disc 10 without any risk of damaging the surfaces.

In order for the rollers 17, 18 to hold the disc 10 from the opposite sides with a predetermined level of pressure, the tables 33a, 33b are provided with respective pneumatic cylinders 61, 61 having respective electro-pneumatic regulators shown as FIG. 5. The piston rods 61a, 61a of the pneumatic cylinders 61, 61 are linked to the respective tables 35a, 35b. The air pressure to be applied to the piston rods 61a, 61a can be controlled to a desired level by means of an electro-pneumatic regulator. Additionally, any fluctuations in the air pressure being applied to the piston rods 61a, 61a can be regulated and corrected to a predetermined level by means of a feedback control system.

The two pneumatic cylinders 61, 61 may be provided with respective electro-pneumatic regulators to control the air pressure in each of the two pneumatic cylinders 61, 61 independently or, alternatively, they may be provided with a single electro-pneumatic regulator that commonly controls the two pneumatic cylinders 61, 61 for the air pressure. Additionally, it may be so arranged that the cam 57 is totally retracted from the two cam rollers 60, 60 if the predetermined frictional force is obtained when the disc 10 is held by the rollers 17, 18 under such condition. Alternatively, one or both of the cam rollers 60, 60 may be left in contact with the cam 57. Still alternatively, the cam 57 may be driven to advance between the two cam rollers 60, 60 under the condition that the two cam rollers 60, 60 do not rotationally move on the cam 57 when the disc 10 is held between the rollers 17, 18. With such an arrangement, the cam 57 will operate as safety device that prevents excessive pressure from being applied to the disc 10 by the pneumatic cylinders 61, 61 if pressure exceeding a predetermined level is applied by the tables 35a, 35b due to a malfunction of the pneumatic cylinder 61.

As shown in FIG. 8, a rotary shaft 63 is received by a bearing 62 rigidly secured to the support table 31 in order to reciprocatingly move the rollers 17, 18 along the X-direction relative to the disc 10 held in position by the paired rollers 13, 14. As shown in FIG. 6, eccentric cams 63a, 63a are rigidly secured to the rotary shaft 63. The cams 63a, 63a have respective an outer peripheral surfaces that are eccentrically arranged relative to the center of rotation of the rotary shaft 63.

Cam following members, or cam followers 64, 64 are fitted to the respective tables 33a, 33b and held in engagement with the eccentric cams 63a, 63a respectively. An electric motor 65 is arranged on the support table 31 and a pulley 67 is fitted to the main shaft 66 of the motor 65. Another pulley 68 is rigidly secured to the rotary shaft 63. An endless timing belt 69 is made to pass about the pulley 67 and the pulley 68. Thus, as the motor 65 is driven, the two eccentric cams 63a, 63a are driven to rotate to oscillate the tables 33a, 33b simultaneously along the X-direction. As a result, they axially reciprocate relative to the rollers 17, 18 and also to the disc 10.

For subjecting the two surfaces of a disc 10 to surface treatment operations including polishing and texturing by means of a surface treatment apparatus having the above configuration, firstly, the cam 57 is made to advance to make the two tables 35a, 35b separated from each other by a predetermined distance in the Y-direction. Then, a disc 10 is brought in and placed between the two rollers 17, 18 by means of a conveyor (not shown) under this condition. The rollers 13, 14 are brought in contact with the outer periphery of the disc 10 to place the latter in right position.

Then, the cam 57 is moved back to make the two tables 35a, 35b approach relative to each other. As the cam 57 is moved on, the cam rollers 60, 60 eventually get to the respective flat slopes 57b, 57b so that, from then on, the tables 35a, 35b are made to approach more slowly relative to each other. Thus, the two rollers 17, 18 slowly come to contact the disc 10. The rollers 17, 18 hold the disc 10 with a predetermined level of pressure as the air pressure fed to the pneumatic cylinders 61, 61 is controlled by the electro-pneumatic regulators.

After the disc 10 is placed in position, a processing solution is discharged from the nozzles 19, 19 and the motors 45, 45 are driven to operate. Thus, the rollers 17, 18 are driven in the opposite directions and the disc 10 is driven to rotate by the rollers 17, 18 so that the rollers 17, 18 slidingly move on the respective outer peripheral surfaces of the disc 10 to perform various operations on the disc 10 including those of removing foreign objects, cleaning, polishing and texturing.

Figure 9:
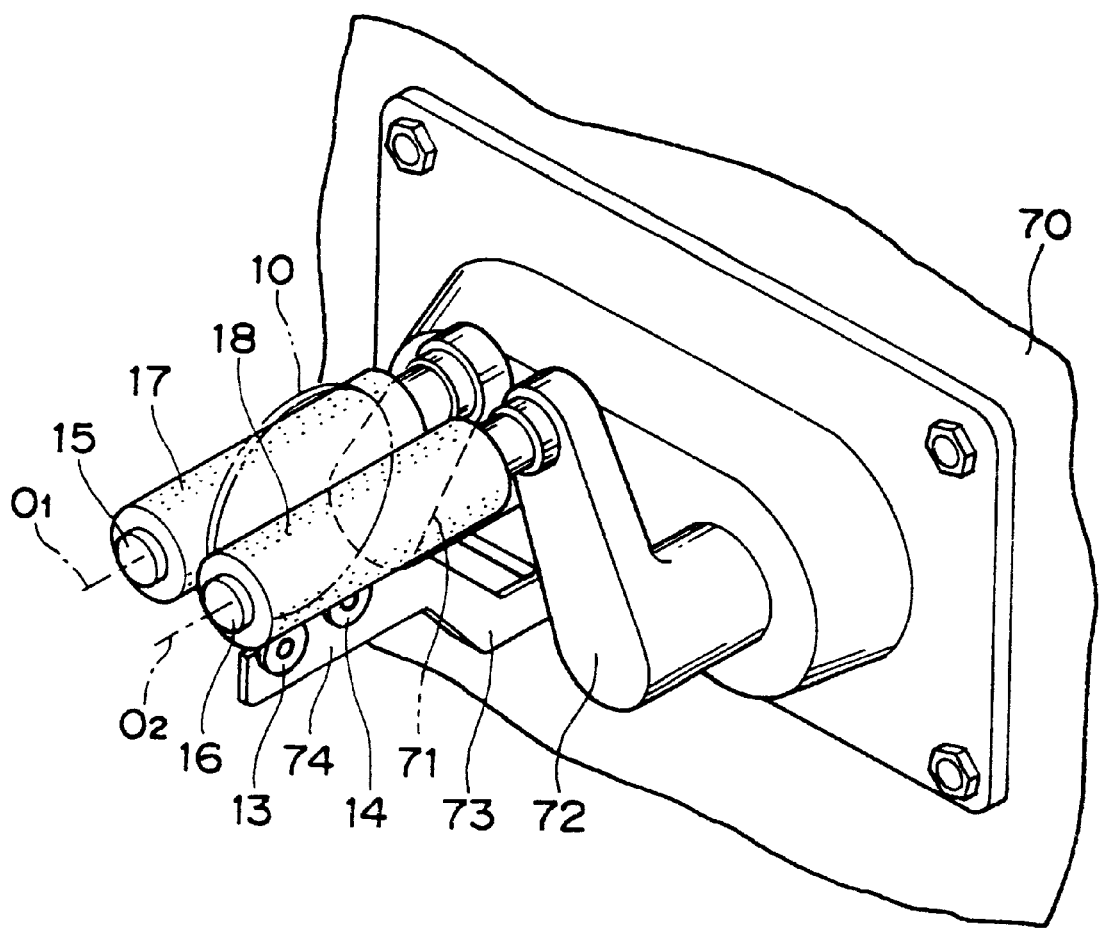
FIG. 9 is a schematic perspective view of a second embodiment of surface treatment apparatus for treating the surface of a rotatable disc according to the invention, showing its basic configuration.
Figure 10:
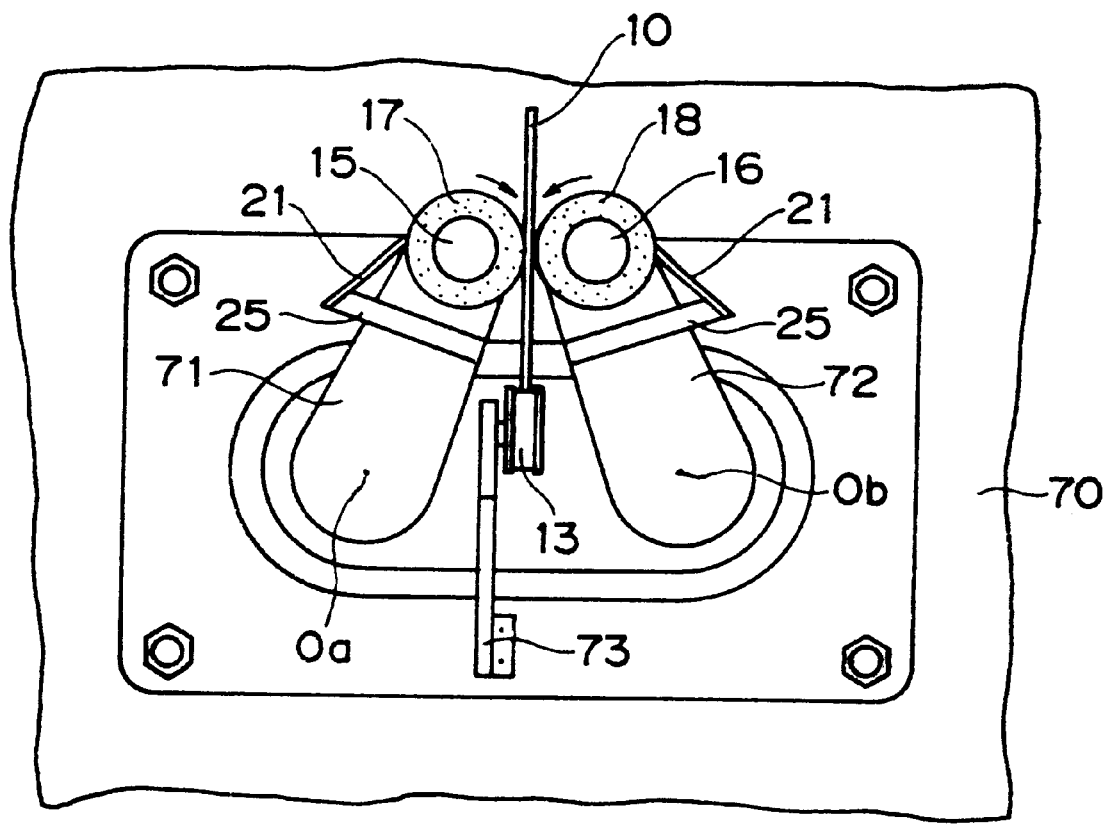
FIG. 10 is a schematic front view of the embodiment of FIG. 9.
Figure 11:
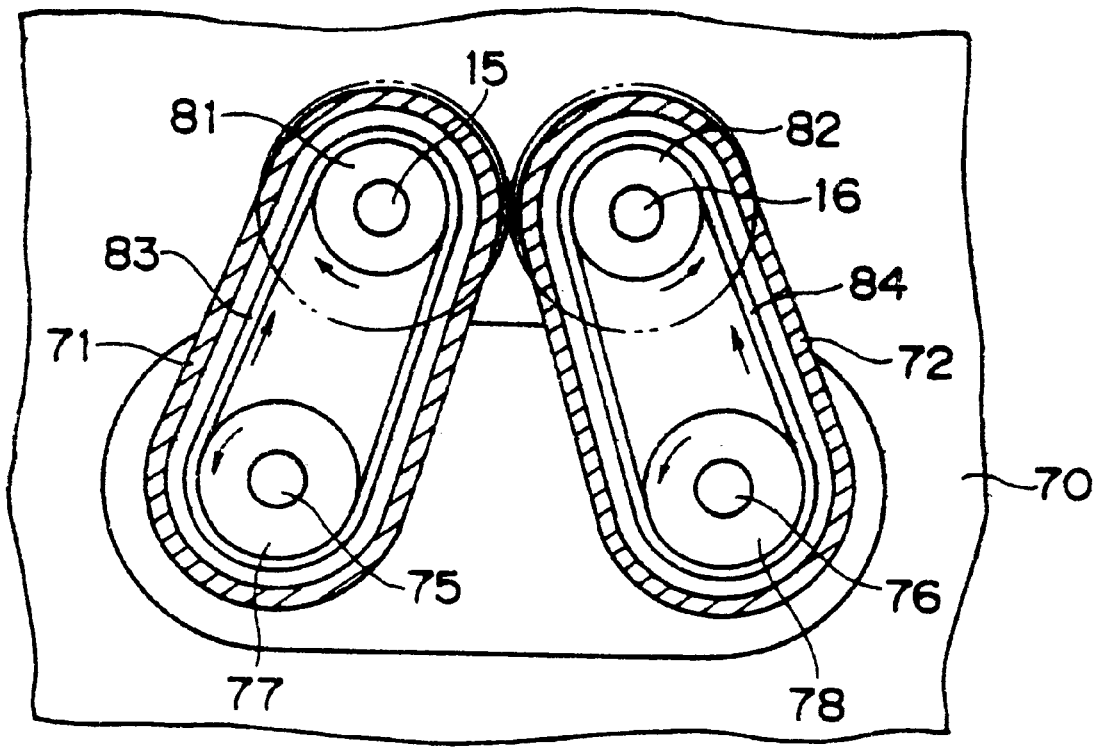
FIG. 11 is a schematic cross sectional view of the oscillation arms of FIG. 10, showing the internal structure thereof.

FIGS. 9 through 11 shows another embodiment of surface treatment apparatus according to the invention. A first oscillation arm 71 and a second oscillation arm 72 have respective axes of oscillation $O_a$, $O_b$ and are fitted to a drive mechanism containing box 70 forming a main body of the apparatus such that they may be made to oscillate relative to the respective oscillation axes. A first drive shaft 15 is rotatably fitted to the front end of the arm 71 and a first treatment roller 17 is rigidly secured to the first drive shaft 15. Similarly, a second drive shaft 16 is rotatably fitted to the front end of the arm 72 and a second treatment roller 18 is rigidly secured to the second drive shaft 16. The axes of rotation $O_1$, $O_2$ of the rollers 17, 18 are arranged substantially in parallel with the axes of oscillation $O_a$, $O_b$.

To begin with, the arms 71, 72 are driven to turn by the respective drive means contained in the box 70 in the respective directions shown in FIG. 10. Then, the rollers 17, 18 are made to oscillate to approach relative to each other and then move away from each other repeatedly.

Positioning rollers 13, 14 brought in contact with the outer periphery of the disc 10 are rotatable relative to a support bracket 73 fitted to the front side of the box 70. As shown in FIG. 10, scrapers 21, 22 are fitted to the respective arms 71, 72 by means of respective fixtures 25, 25 in order to remove the foreign objects adhering to the outer peripheral surfaces of the respective rollers 17, 18.

FIG. 11 is a cross sectional view of the arms 71, 72, showing the internal structure thereof. Rotary shafts 75, 76 are arranged at the base sections of the respective arms 71, 72 and driven to rotate by a motor (not shown). Pulleys 77, 78 are fitted to the rotary shafts 75, 76 respectively and pulleys 81, 82 are fitted to the respective drive shafts 15, 16 that are rotatably fitted to the front ends of the respective arms 71, 72. A timing belt 83, which is an endless belt, is made to pass about the pulley 77 and the pulley 81 and another timing belt 84, which is also an endless belt, is made to pass about the pulley 78 and the pulley 82 so that the rotary motion of each of the rotary shafts 75, 76 is transmitted to the corresponding one of the rollers 17, 18. The arms 71, 72 may be provided with a tension roller to apply tensile strength to the timing belts 83, 84.

The pulleys 77, 78, 81, 82 of the power transmission mechanisms in the arms 71, 72 may be replaced by gears so that power may be transmitted from gear to gear by way of idle gears.

Figure 12:
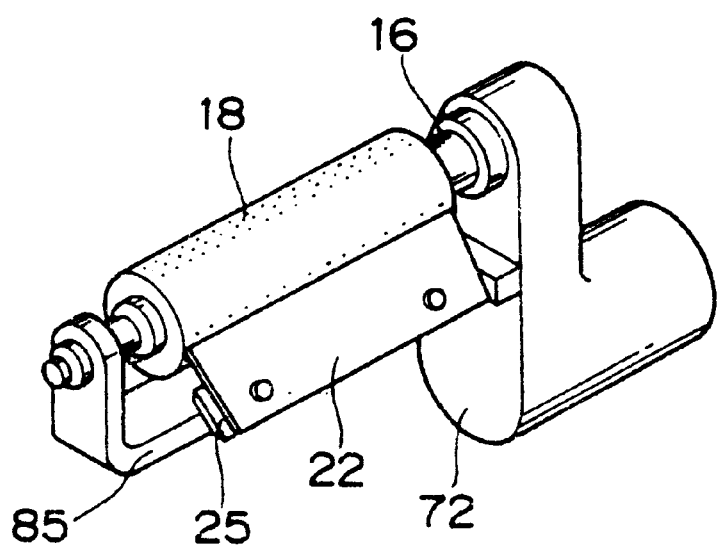
FIG. 12 is a schematic perspective view of an oscillation arm obtained by modifying one of the oscillation arms of the second embodiment.

FIG. 12 is a schematic perspective view of an alternative oscillation arm that may be used for the purpose of the invention. While only a single arm 72 is illustrated in FIG. 12, the arm 72 and another identical arm 71 may be used to replace the arms of the above embodiment.

The drive shaft 16 fitted to the oscillation arm 72 of FIG. 12 differs from its counterpart of the above embodiment in that the drive shaft 16 of the above embodiment is secured only at the rear end whereas the drive shaft 16 of FIG. 12 is supported also at the front end by a support bracket 85. A scraper 22 is fitted to the support bracket 85 to remove foreign objects from the corresponding surface of the disc 10.

The arrangement of FIG. 12 where the rollers 17, 18 are fitted to the front ends of the respective arms 71, 72 is advantageous in that the power transmission mechanisms and the power source are protected against contamination by the processing solution because the power transmission mechanisms are contained in the respective arms 71, 72 and the power source is housed in the box 70.

Detailed description has hereinabove been given of the invention achieved by the present inventor with reference to the embodiments. However, the present invention should not be limited to the embodiments described above and may be variously modified within the scope not departing from the gist.

For instance, while the illustrated embodiments are used for polishing and texturing the surface of a rotatable disc, they may be used only for cleaning and grinding.

We claim:

1. A surface treatment method for a rotatable disc having two parallel first and second flat surfaces facing in opposite directions and an axis of rotation perpendicular to said two flat surfaces, said method comprising the steps of:

bringing a pair of positioning rollers into supporting contact with the outer periphery of said rotatable disc;

holding said rotatable disc between a first treatment roller brought into contact with the first flat surface of said rotatable disc and a second treatment roller brought into contact with the second flat surface of said rotatable disc, each of said treatment rollers having a rotational axis substantially parallel to said flat disc surfaces and substantially intersecting said rotation axis of the disc, and each of said rollers having portions located on opposite sides of said rotation axis of the disc;

rotating said first and second treatment rollers in opposite directions so that said first and second treatment rollers exert frictional forces on said first and second flat surfaces of the disc urging said outer periphery of the disc into said supporting contact with the positioning rollers, and so that for each roller the portion thereof located on one side of the disc rotation axis creates a frictional force tending to rotate the disc in one direction about the disc rotation axis and the portion thereof located on the other side of the disc rotation axis creates a friction force tending to rotate the disc in the opposite direction about the disc rotation axis, conditioning said two treatment rollers so that the friction forces created by said roller portions and tending to rotate the disc in one direction are greater than the friction forces created by said roller portions and tending to rotate said disc in the opposite direction so that said disc is rotated about said disc rotation axis in said one direction solely by the influence of the friction forces imposed on it by said first and second rollers with said first and second rollers sliding relative to said first and second disc surfaces; and feeding said two treatment rollers with a treatment solution so that said first and second surfaces of the disc are treated by the sliding of said first and second rollers relative to said first and second disc surfaces in the presence of said treatment solution.

2. A surface treatment method for a rotatable disc according to claim 1, wherein said two treatment rollers are made to axially oscillate along the respective surfaces of said rotatable disc.

3. A surface treatment method for a rotatable disc according to claim 1, wherein the foreign objects, if any, adhering to the outer peripheral surfaces of said two treatment rollers are removed by means of foreign object removing members brought in contact with the outer peripheral surfaces of the respective treatment rollers.

4. A surface treatment apparatus for a rotatable disc having two parallel flat surfaces and a rotation axis perpendicular to the two flat surfaces, said apparatus comprising:

a pair of positioning rollers to be brought into contact with the outer periphery of the rotatable disc to positionally set the rotation axis of said rotatable disc relative to the apparatus;

a first driven treatment roller adapted to contact one of the flat surfaces of said rotatable disc;

a second driven treatment roller arranged along said first treatment roller and adapted to move close to and away from said first treatment roller and contact the other flat surface of said rotatable disc in order to hold said rotatable disc in cooperation with said first treatment roller;

a treatment solution feeding means for feeding each of the treatment rollers with a treatment solution; and drive means for driving said first and second treatment rollers in respective directions opposite to each other to cause said treatment rollers to apply frictional forces to said disc some of which frictional forces tend to rotate said disc in one direction about the disc rotation axis and other of which frictional forces tend to rotate said disc in the opposite direction about the disc rotation axis;

said apparatus being adapted to have the frictional forces which tend to rotate said disc in said one direction be greater than the frictional forces which tend to rotate the disc in said opposite direction so that said disc is rotated in said one direction solely as a result of the frictional forces applied to it by said treatment rollers and so that said treatment rollers slide on the flat surfaces of the disc to treat the flat surfaces by the action of said two treatment rollers in the presence of the treatment solution.

5. A surface treatment apparatus for a rotating disc according claim 4, wherein the distance between the axes of rotation said treatment rollers is differentiated between the opposite ends of the treatment rollers.

6. A surface treatment apparatus for a rotating disc according to claim 4, wherein the outer diameter of at least one of the treatment rollers is differentiated between the opposite ends thereof.

7. A surface treatment apparatus for a rotating disc according to claim 4, wherein said first treatment roller is fitted to a first movable table adapted to reciprocatingly move along the radial direction of the roller and said second treatment roller is fitted to a second movable table adapted to move in the direction same as that of said first movable table so that said first and second treatment rollers may come close to and away from each other by moving at least one of said first and second movable tables.

8. A surface treatment apparatus for a rotating disc according to claim 4, wherein said first treatment roller is fitted to a first movable table adapted to reciprocatingly move along the radial direction of the roller and said second treatment roller is fitted to a second movable table adapted to move in the same direction as that of said first movable table, and a cam member is provided between said first and second moving tables so as to be movable back and forth in a direction perpendicular relative to the moving direction of said first and second moving tables and is engaged with cam followers arranged respectively on said first and second movable tables, so that the distance between said first moving table and said second moving table is adjustable by movement of said cam member.

9. A surface treatment apparatus for a rotatable disc according to claim 4, wherein said first treatment roller is fitted to a third movable table adapted to reciprocatingly move along the axial direction of the roller and said second treatment roller is fitted to a fourth movable table adapted to move in the same direction as that of said third movable table, said third and fourth movable tables are provided with respective cam following members, and an eccentric cam is arranged in engagement with said cam following members and is rotatable to reciprocatingly drive said third and fourth movable tables in the axial direction of said first and second treatment rollers.

10. A surface treatment apparatus for a rotating disc according to claim 4, wherein said first treatment roller is fitted to the front end of a first oscillation arm having its axis of oscillation disposed in parallel with the axis of rotation of said first treatment roller and said second treatment roller is fitted to the front end of a second oscillation arm having its axis of oscillation disposed in parallel with the axis of rotation said second treatment roller so that said first and second treatment rollers are moved close to and away from each other by oscillating at least either of said first and second oscillation arms around its axis of oscillation.

\* \* \* \* \*